(No Model.)
F. MANN & H. H. AKERS.
CASTER.
No. 523,772. Patented July 31, 1894.
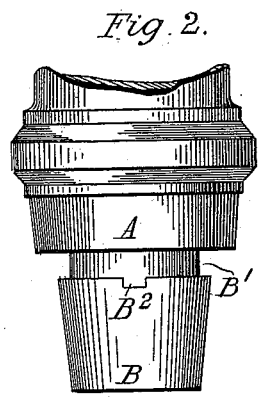
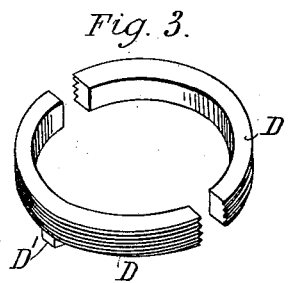
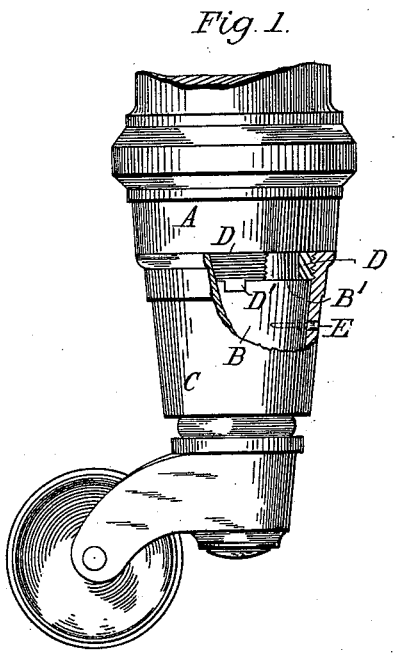
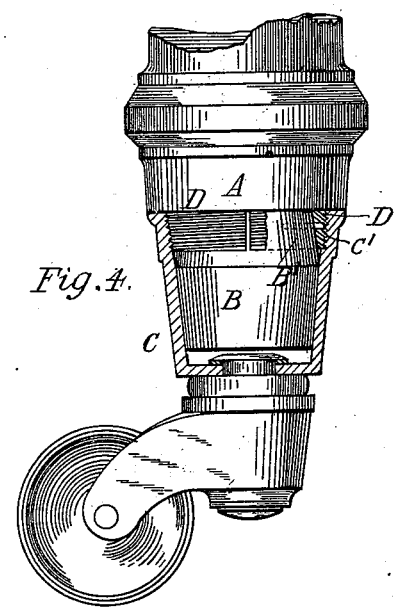
Witnesses
Inventors,
Frederick Mann
Henry Herbert Akers
by W. Bakewell Sons
their attorneys

UNITED STATES PATENT OFFICE.

FREDERICK MANN AND HENRY HERBERT AKERS, OF LONDON, ENGLAND.

CASTER.

SPECIFICATION forming part of Letters Patent No. 523,772, dated July 31, 1894.

Application filed September 6, 1893. Serial No. 484,946. (No model.)

*To all whom it may concern:*

Be it known that we, FREDERICK MANN and HENRY HERBERT AKERS, subjects of the Queen of England, residing at London, England, have invented certain new and useful Improvements in or Relating to the Securing of Furniture-Casters, of which the following is a specification.

This invention relates to furniture casters and the means for fastening them onto the legs of furniture and the like, and will be best understood by reference to the accompanying drawings, in which—

Figure 1 shows the end of the wooden leg of a chair or table with the complete caster in position, a portion being broken away for the sake of clearness. Fig. 2 shows the end of the leg ready to receive the caster; Fig. 3 a divided ring, and Fig. 4 is similar to Fig. 1 with a slight modification.

Like letters represent like parts throughout the drawings.

A represents the leg to which the caster is to be attached, the end B thereof being coned to fit the interior of the caster socket C. A groove B' is formed between the conical portion B and the body of the leg A to accommodate the divided ring D Fig. 3, a notch or recess B² being preferably formed to receive the lug or projection D' formed upon one-half of the ring D.

The ring D is screw-threaded on the exterior and in use is fitted into the groove B' Fig. 2 where it lies snugly as shown in Figs. 1 and 4, the lug D' fitting into the recess B² preventing either half of the ring from turning. The caster socket C is screw-threaded internally at C' and to fix it on to the chair leg it is placed on the conical portion B and screwed on to the divided ring D as shown in Figs. 1 and 4 with the result that while the socket C prevents the two parts of the ring from separating or escaping from the chair leg the ring itself fitting in the groove B' and having the socket C screwed upon it prevents the said socket from escaping the whole caster being thus securely fixed in position being jammed upon the cone B and against the end of the leg body A and screwed up sufficiently firm for the purpose. To prevent the caster from becoming unscrewed a pin or screw E may be passed through it into the cone B or glue or other adhesive material may be employed to prevent it from turning.

If it is desired to remove the caster the pin E may be driven into the cone B until the socket C is clear or if a screw be employed it may be unscrewed after which the caster can be turned and unscrewed from the collar D.

The only difference between Figs. 1 and 4 is that the ring D is formed conical upon its interior periphery to prevent it from working down the cone B and the recess B' is practically or entirely dispensed with.

We claim—

1. A socket-fastening device comprising a divided and externally screw-threaded ring arranged to be secured to the article, and a socket having an internal screw thread arranged to fit upon the ring; substantially as described.

2. In a socket fastening device the combination with an internally screw-threaded socket of an externally screw-threaded divided ring B the socket being tapered and fitting upon the end of the wooden article to which it is to be attached and the ring fitting into a recess above the cone as set forth.

3. A socket-fastening device comprising a divided and externally screw-threaded ring, having a lug arranged to fit in a recess of the article, and a socket having an internal screw thread arranged to fit upon the ring; substantially as described.

4. The combination in a socket fastening device of a socket screwed internally a divided ring screw-threaded externally and coned internally and a conical recess or bed to receive the ring as set forth.

In testimony whereof we have hereto set our hands in the presence of two subscribing witnesses.

FREDERICK MANN.
   HENRY HERBERT AKERS.

Witnesses:
 ALFRED J. BOULT,
 HAROLD WADE.